(12) United States Patent
Kubota et al.

(10) Patent No.: US 8,247,250 B2
(45) Date of Patent: Aug. 21, 2012

(54) METHOD FOR MANUFACTURING LIQUID CRYSTAL DISPLAY DEVICE

(75) Inventors: Daisuke Kubota, Isehara (JP); Takeshi Nishi, Atsugi (JP); Akio Yamashita, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1200 days.

(21) Appl. No.: 11/602,997

(22) Filed: Nov. 22, 2006

(65) Prior Publication Data

US 2007/0116901 A1    May 24, 2007

(51) Int. Cl.
  *H01L 31/0232* (2006.01)
  *G02F 1/1337* (2006.01)
(52) U.S. Cl. .......................... 438/30; 349/130
(58) Field of Classification Search ............ None
  See application file for complete search history.

(56) References Cited

U.S. PATENT DOCUMENTS

| | | | |
|---|---|---|---|
| 5,066,104 A * | 11/1991 | Mohebban et al. | 349/199 |
| 5,186,986 A | 2/1993 | Ogawa | |
| 5,256,456 A | 10/1993 | Ogawa | |
| 5,596,434 A | 1/1997 | Walba et al. | |
| 6,429,917 B1 * | 8/2002 | Okamoto et al. | 349/110 |
| 6,451,392 B1 * | 9/2002 | Ootake et al. | 428/1.23 |
| 6,788,383 B1 * | 9/2004 | Jeunink et al. | 355/30 |
| 7,476,424 B2 * | 1/2009 | Jeong et al. | 428/1.26 |
| 7,495,739 B2 * | 2/2009 | Hirato et al. | 349/155 |
| 2002/0047963 A1 * | 4/2002 | Youn et al. | 349/110 |

FOREIGN PATENT DOCUMENTS

| | | |
|---|---|---|
| EP | 0 476 543 | 3/1992 |
| GB | 2 366 874 | 3/2002 |
| JP | 04-081721 | 3/1992 |
| JP | 04-356020 | 12/1992 |
| JP | 2000-321562 | 11/2000 |
| JP | 2001-255533 A | 9/2001 |
| JP | 2002-023169 | 1/2002 |
| JP | 2005-018092 A | 1/2005 |
| JP | 2005-181794 A | 7/2005 |

OTHER PUBLICATIONS

International Search Report (Application No. PCT/JP2006/323046) dated Feb. 6, 2007.
Written Opinion (Application No. PCT/JP2006/323046) dated Feb. 6, 2007.

* cited by examiner

*Primary Examiner* — Zandra Smith
*Assistant Examiner* — Pamela E Perkins
(74) *Attorney, Agent, or Firm* — Eric J. Robinson; Robinson Intellectual Property Law Office, P.C.

(57) ABSTRACT

An object is to uniformly align liquid crystal molecules without requiring a step of forming an alignment film. A material for forming a self-assembled monolayer is dispersed in a liquid crystal material, and the mixture is interposed between a pair of substrates by a liquid crystal injection method or a liquid crystal dropping method. A silane coupling agent (the material for forming a self-assembled monolayer) injected or dropped with the liquid crystal material adsorbs to a substrate interface (or a surface of an electrode formed over a substrate) after the injection or dropping, thereby forming a self-assembled monolayer. This self-assembled monolayer serves as an alignment film, and enables long axes of liquid crystal molecules to be approximately perpendicular to a substrate and the liquid crystal molecules to be uniformly aligned.

17 Claims, 12 Drawing Sheets

FIG. 5A-1 FIG. 5A-2
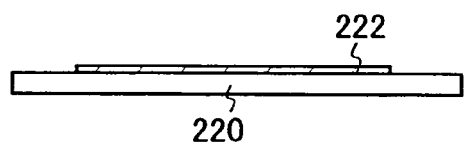
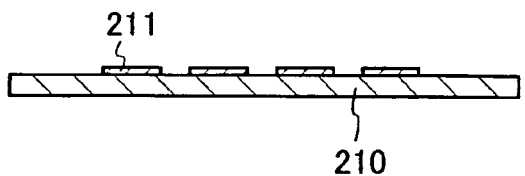
FIG. 5B-1 FIG. 5B-2
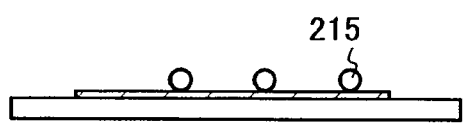
FIG. 5C
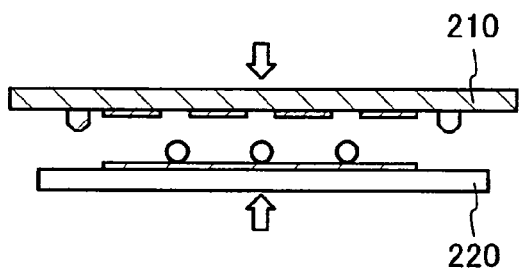
FIG. 5D
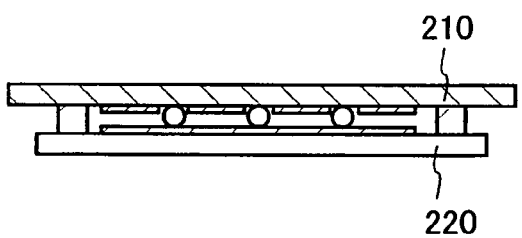
FIG. 5E
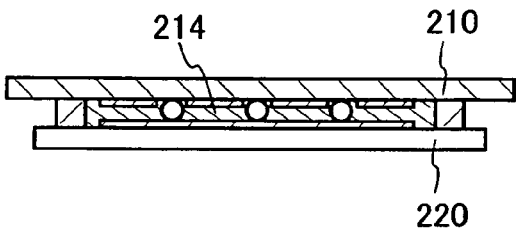

METHOD FOR MANUFACTURING LIQUID CRYSTAL DISPLAY DEVICE

TECHNICAL FIELD

The present invention relates to a liquid crystal display device and a method for manufacturing the liquid crystal display device. The present invention relates to, for example, an electro-optical device typified by a liquid crystal display panel which has a circuit including a thin film transistor (hereinafter referred to as a TFT), and an electronic device equipped with such an electro-optical device as a component.

BACKGROUND ART

In recent years, a technique for forming a thin film transistor (TFT) using a semiconductor thin film (with a thickness of approximately several to several hundreds nm) which is formed over a substrate having an insulating surface has attracted attention. The thin film transistor is widely applied to an electronic device such as an electro-optical device or an IC, and has been hurriedly developed particularly as a switching element of a liquid crystal display device.

In a liquid crystal display device used for a notebook personal computer or a cellular phone, a large number of pixels are formed by sandwiching a liquid crystal material between a pair of light-transmitting substrates at least one of which is provided with a transparent electrode, and each pixel is provided with a switching element which selects an electrode. The liquid crystal display device performs display by selecting the switching element, performing optical switching of liquid crystal molecules by voltage application, and turning on and off each pixel.

In a liquid crystal display device, liquid crystal molecules need to be uniformly aligned in order to improve display characteristics. Liquid crystal alignment treatment of an alignment film provided to uniformly align liquid crystal molecules includes alignment treatment called rubbing and alignment treatment by light irradiation.

The alignment treatment by rubbing is a method of forming an alignment film over a substrate and then rubbing a surface of the alignment film with nylon, rayon, or the like, and is widely used for manufacturing of liquid crystal display devices. However, since rubbing is a method of directly rubbing an alignment film with cloth, it has problems of static electricity generation and dust generation by scraping the alignment film. The static electricity generation may result in destruction of a switching element formed over a substrate.

In the alignment treatment by light irradiation, it is necessary to form an alignment film using a special material and make irradiation light obliquely incident on a surface of the alignment film in order to form a pretilt angle. Therefore, it is difficult to uniform irradiation light energy with respect to a surface of a substrate, and a pretilt angle may become uneven.

In a TN mode liquid crystal display, rubbing treatment using light irradiation or cloth is required after forming an alignment film. Thus, a vertical alignment (VA) mode liquid crystal display which performs liquid crystal alignment using a rib structure or a technique of alignment division has attracted attention.

An example of the VA (Vertical Alignment) mode is a PVA (Patterned Vertical Alignment) mode, an MVA (Multi-domain Vertical Alignment) mode, or the like.

In addition, Reference 1 discloses that liquid crystal is vertically aligned by a technique using as an alignment film a self-assembled monolayer obtained by applying a solution of a silane compound suspended in a solvent over a transparent conductive layer and baked to remove the solvent (Reference 1: Japanese Published Patent Application No. 2002-23169).

DISCLOSURE OF INVENTION

It is an object of the present invention to uniformly align liquid crystal molecules without requiring a step of forming an alignment film.

According to the present invention, a material for forming a self-assembled monolayer is dispersed in a liquid crystal material, and the mixture is interposed between a pair of substrates by a liquid crystal injection method or a liquid crystal dropping method. This enables liquid crystal molecules to be uniformly aligned without requiring a step of forming an alignment film and alignment treatment. In other words, the formation of an alignment film and the filling and sealing of liquid crystal are performed in the present invention simultaneously in a step of filling and sealing liquid crystal instead of sequentially performing a step of forming an alignment film and a step of filling and sealing liquid crystal.

A silane coupling agent (a material for forming a self-assembled monolayer) injected or dropped with a liquid crystal material adsorbs to a substrate interface (or a surface of an electrode formed over a substrate) after the injection or dropping, thereby forming a self-assembled monolayer. This self-assembled monolayer serves as an alignment film, and enables long axes of liquid crystal molecules to be approximately perpendicular to a substrate and the liquid crystal molecules to be uniformly aligned.

Note that the present invention does not employ a flow alignment method. The flow alignment method is a method for automatically aligning liquid crystal molecules in a certain direction by utilizing a flow caused by introducing liquid crystal molecules into a cell by a liquid crystal injection method.

In addition, the liquid crystal material used in the present invention does not contain a high molecular material (such as a photopolymerizable monomer, a photoinitiator, or a liquid crystalline monomer for alignment control), and the present invention provides a liquid crystal display device which does not utilize so-called polymer dispersed liquid crystal (PDLC). A polarizing plate is not used in the case of using the polymer dispersed liquid crystal (PDLC), while a polarizing plate is used in the present invention without a high molecular material included in a liquid crystal material. The present invention provides a liquid crystal display panel in which a liquid crystal material is sandwiched between two polarizing plates so that polarizing axes thereof are perpendicular to each other and which is non-transmissive in an initial state before voltage application.

The present invention provides a method for manufacturing a liquid crystal display device efficiently using a large-area substrate having a size of, for example, 320 mm×400 mm, 370 mm×470 mm, 550 mm×650 mm, 600 mm×720 mm, 680 mm×880 mm, 1000 mm×1200 mm, 1100 mm×1250 mm, or 1150 mm×1300 mm. The present invention further provides a method for manufacturing a liquid crystal display device suitable for mass production using a large-area substrate having a size of 1500 mm×1800 mm, 1800 mm×2000 mm, 2000 mm×2100 mm, 2200 mm×2600 mm, 2600 mm×3100 mm, or the like.

Sealing of liquid crystal requires a complex process such as seal drawing, attachment of an opposite substrate, division, injection of liquid crystal, and sealing of an inlet for injecting liquid crystal. In particular, as a panel size is increased, it becomes difficult to inject liquid crystal using a capillary phenomenon to fill a region surrounded by seal (including at least a pixel portion) with liquid crystal.

In one aspect of the present invention disclosed in this specification, a method for manufacturing a liquid crystal display device including a first substrate, a second substrate, and liquid crystal held between a pair of substrates that are the first substrate and the second substrate, includes the steps of forming a pixel electrode over the first substrate, forming an opposite electrode over the second substrate, drawing and temporarily fixing a sealant over the second substrate, dropping a mixture containing a liquid crystal material and a silane coupling agent in a region surrounded by the sealant over the second substrate, attaching the first substrate and the second substrate to each other under reduced pressure, and fixing the sealant.

As for liquid crystal dropping, a dispenser apparatus or an ink-jet apparatus may be used. It is important to drop liquid crystal in a closed seal pattern with high accuracy and with a stabilized amount. Note that an ink-jet method is performed by jetting (or dropping) plural drops of liquid crystal, the amount of each of which is minute, toward a pixel electrode. By using an ink-jet method, the amount of liquid crystal can be freely adjusted by the number of discharges, the number of discharge points, or the like.

In addition, dropping (or jetting) of liquid crystal is preferably performed in an inert atmosphere so as to prevent mixing of an impurity. While dropping (or jetting) liquid crystal, a substrate is heated to deaerate liquid crystal and to decrease the viscosity of liquid crystal. In addition, thickness may be uniformed, if necessary, by spinning after dropping liquid crystal. Further, attachment operation is preferably performed under reduced pressure so that air bubbles are not mixed during the attachment.

In addition, a liquid crystal dropping method can eliminate material loss because a necessary amount of liquid crystal is dropped only in a necessary portion. Since a seal pattern is a closed loop, a seal pattern for an inlet for injecting liquid crystal and a path is unnecessary. Accordingly, a defect caused at the time of liquid crystal injection (such as defective alignment) can be eliminated.

If a panel size is medium or small, a liquid crystal injection method using a capillary phenomenon can also be used. In another aspect of the invention, a method for manufacturing a liquid crystal display device including a first substrate, a second substrate, and liquid crystal held between a pair of substrates that are the first substrate and the second substrate, includes the steps of forming a pixel electrode over the first substrate, forming an opposite electrode over the second substrate, drawing and temporarily fixing a sealant over the second substrate, attaching the first substrate and the second substrate to each other, fixing the sealant, and injecting a mixture containing a liquid crystal material and a silane coupling agent into a region surrounded by the sealant.

In each of the above aspects, it is preferable to perform realignment treatment, that is, heating for aligning liquid crystal molecules of the liquid crystal material so that long axes thereof are perpendicular to a substrate. In particular, in the case of injecting liquid crystal after attaching a pair of substrates to each other, a flow of liquid crystal at the time of injection may remain as flow alignment. Therefore, it is preferable to perform realignment treatment by performing heating (for example, at 80° C. to 200° C. for 10 minutes, preferably at 100° C. to 170° C. for 10 minutes). At the time of this realignment treatment, a favorable monolayer (referred to as a self-assembled monolayer or an SAM) can also be formed by promoting a self-assembly reaction of the mixture.

In each of the above aspects, one of features of the mixture is to contain the silane coupling agent of 0.001 wt % to 10 wt % inclusive. In addition, another feature of the mixture is that it is obtained by stirring a silane coupling agent into a liquid crystal material. Since it is acceptable as long as the silane coupling agent is dispersed in the liquid crystal material, the timing of dispersion may be either before or after deaerating the liquid crystal material. Note that stirring while heating is preferably performed in order to disperse a silane coupling agent in a liquid crystal material.

Note that in the case where a liquid crystal material contains a large amount of a silane coupling agent, for example, of 0.1 wt % or more, the remaining silane coupling agent which is not changed into a self-assembled monolayer, that is, an unreacted silane coupling agent exists between a pair of substrates in a mixed state with liquid crystal. When a liquid crystal material contains a silane coupling agent of more than 10 wt %, a voltage holding ratio and an NI point are lowered, which is unfavorable.

In this specification, the silane coupling agent is a silicon-based compound including a site which can be bound with (chemically adsorbed to) a substrate (for example, an alkoxy group which hydrolyzes and provides a silanol group (such as a trialkoxysilane-based compound) or a halogen atom (such as a trihalosilane-based compound)) and a site having vertical alignment with respect to liquid crystal molecules (for example, an alkyl group having 10 to 22 carbon atoms, a fluoroalkyl group, or the like). As a specific example of the silane coupling agent, octadecyltrimethoxysilane (also referred to as ODS), octadecyltrichlorosilane (also referred to as OTS), NN-dimethyl-N-octadecyl-3-aminopropyl trimethoxysilyl chloride (also referred to as DMOAP), or the like can be given. However, the silane coupling agent is not limited thereto.

In addition, the silane coupling agent forms a self-assembled monolayer through reactions such as hydrolysis and condensation. Therefore, a solvent such as water, alcohol, or ketone may be added to liquid crystal in order to promote hydrolysis; however, the silane coupling agent is hydrolyzed enough with atmospheric moisture or the like. In addition, it is possible that a liquid crystal material is mixed with water, alcohol, ketone, or the like due to temporal exposure to the atmosphere in a liquid crystal synthesis step or in a normal manufacturing step of a liquid crystal display device. Such a content is a sufficient amount to complete the reactions such as hydrolysis and condensation; thus, it is not necessarily needed to intentionally add the solvent. In the case of intentionally adding water, alcohol, ketone, or the like, the content thereof is preferably 1 wt % or less because excessive addition results in an adverse influence such as a reduction in voltage holding ratio characteristics.

Since the above-described silane coupling agent including a trihalosilane-based compound has high hydrolyzability, a solvent without a hydroxyl group or a carbonyl group is preferably used.

In the case of using the silane coupling agent including a trialkoxysilane-based compound, a carboxylic acid may be added as a catalyst to further promote a hydrolysis reaction.

The liquid crystal display device of the present invention employs a driving method in which VA (Vertically Aligned) mode liquid crystal with a negative dielectric anisotropy is aligned vertically in a no-voltage state and aligned horizontally in a state with a voltage applied. Since liquid crystal is aligned in a vertical direction in a no-voltage state, the liquid crystal display device has advantages of high-quality black display, high contrast, wide viewing angle, and high-speed response.

Since the present invention does not require rubbing treatment and optical alignment treatment, liquid crystal molecules can be uniformly aligned even in a large-screen liquid crystal display device using a large-area substrate.

BRIEF DESCRIPTION OF DRAWINGS

FIGS. 5A-1 to 5E are cross-sectional views showing a manufacturing process of the present invention.

BEST MODE FOR CARRYING OUT THE INVENTION

Embodiment modes of the present invention are hereinafter explained.

EMDODIMENT MODE 1

Here, an example of performing seal drawing and liquid crystal dropping on an opposite substrate side is explained. The flow of panel manufacturing is hereinafter explained.

Figures 1, 1A:
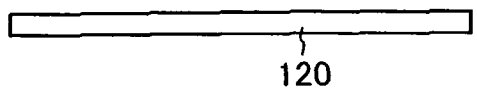
FIGS. 1A-1 to 1F are cross-sectional views showing a manufacturing process of the present invention.
Figures 1, 1A, 2:
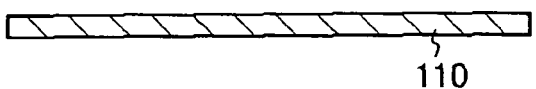

First, a second substrate 120 serving as an opposite substrate and a first substrate 110 provided with a TFT (not shown) in advance are prepared as shown in FIG. 1A-1 and FIG. 1A-2. The first substrate 110 and the second substrate 120 are not particularly limited as long as they are substrates having a light transmitting property. As for the substrate having a light transmitting property, glass such as quartz glass or barium borosilicate glass, or a material such as a transparent acrylic resin or polycarbonate can be used.

Note that the TFT may be any of a TFT using polysilicon as an active layer (also referred to as a polysilicon TFT), a TFT using amorphous silicon as an active layer (also referred to as amorphous silicon TFT), and a TFT using an organic semiconductor material as an active layer (also referred to as an organic TFT).

Figures 1, 1B:
Figures 1, 1B, 2:

Next, an opposite electrode 122 made of a transparent conductive film is formed over the second substrate 120. A pixel electrode 111 made of a transparent conductive film is formed over the first substrate 110. Further, a columnar spacer 115 made of an insulator for maintaining a distance between the substrates is formed over the first substrate 110 (FIG. 1B-1 and FIG. 1B-2).

Figures 1, 1C:
Figures 1, 1C, 2:

Next, a sealant 112 is drawn over the second substrate 120. As the sealant 112, a photo-curing resin or a thermosetting resin may be used. As the sealant 112, a sealant containing filler (with a diameter of 0.5 μm to 10 μm) and having a viscosity of 40 Pa·s to 400 Pa·s is used. Note that a seal material which does not dissolve in liquid crystal to be in contact with later is preferably selected. This sealant 112 is formed into a closed loop and surrounds a display region. At this point, the sealant is temporarily baked (FIG. 1C-1 and FIG. 1C-2).

Figures 1, 1D:
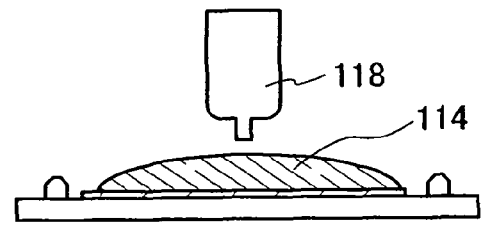
Figures 1, 1D, 2:
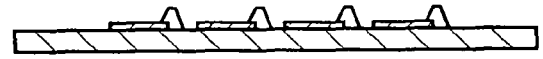

Then, a mixture 114 of a liquid crystal material and a silane coupling agent is dropped from a dispenser 118 into a region surrounded by the sealant 112 (FIG. 1D-1 and FIG. 1D-2). As for liquid crystal, a VA mode liquid crystal material having a viscosity sufficient for dropping may be used. By using a dispenser, a necessary amount of the mixture can be held without waste in the region surrounded by the sealant 112. Alternatively, the mixture may be dropped using an ink-jet method.

After that, liquid crystal is deaerated under reduced pressure. Alternatively, deaeration may be performed in advance before dropping liquid crystal.

Figure 1E:
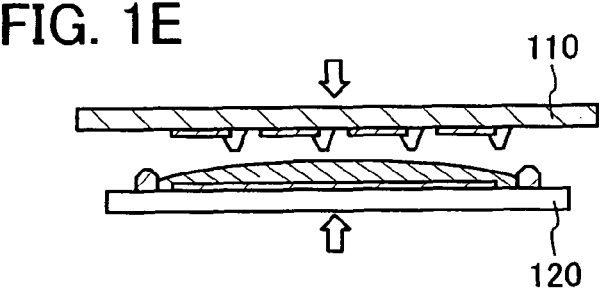

Next, the first substrate 110 provided with a pixel portion is attached to the second substrate 120 provided with the opposite electrode 122 and an alignment film under reduced pressure so that air bubbles do not enter (FIG. 1E).

Then, heat treatment is performed. By performing this heat treatment, the silane coupling agent contained in the mixture forms a self-assembled monolayer. This self-assembled monolayer serves as an alignment film to align liquid crystal vertically.

Figure 1F:
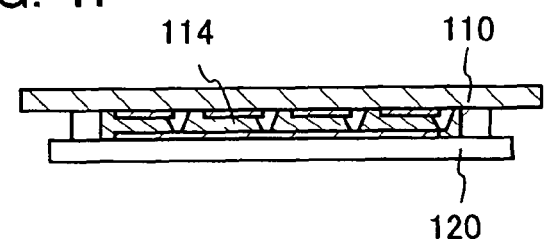

After that, the sealant 112 is cured by performing ultraviolet ray irradiation or heat treatment (FIG. 1F). Note that heat treatment may be performed while performing ultraviolet ray irradiation.

Through the above steps, liquid crystal is held between the pair of substrates. In this embodiment mode, after dropping liquid crystal under atmospheric pressure, the attachment step is performed under reduced pressure. Further, the drawing of the sealant may also be performed under reduced pressure.

In the case of manufacturing a plurality of panels from one substrate, the first substrate or both substrates is/are cut using a cutting apparatus such as a scriber apparatus, a breaker apparatus, or a roll cutter after attaching the pair of substrates to each other. Thus, a plurality of panels can be manufactured from one substrate.

Figure 2A:
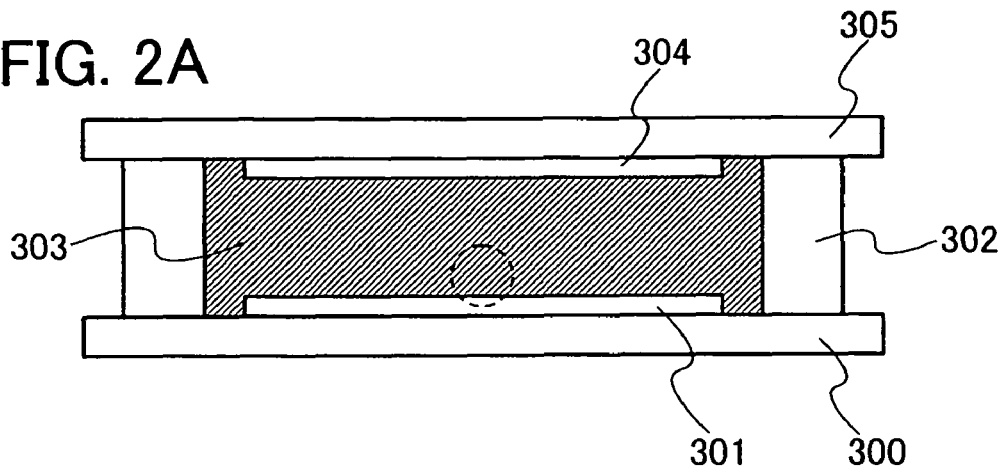
FIGS. 2A and 2B are diagrams showing a cross-sectional structure of a liquid crystal display device.
Figure 2B:
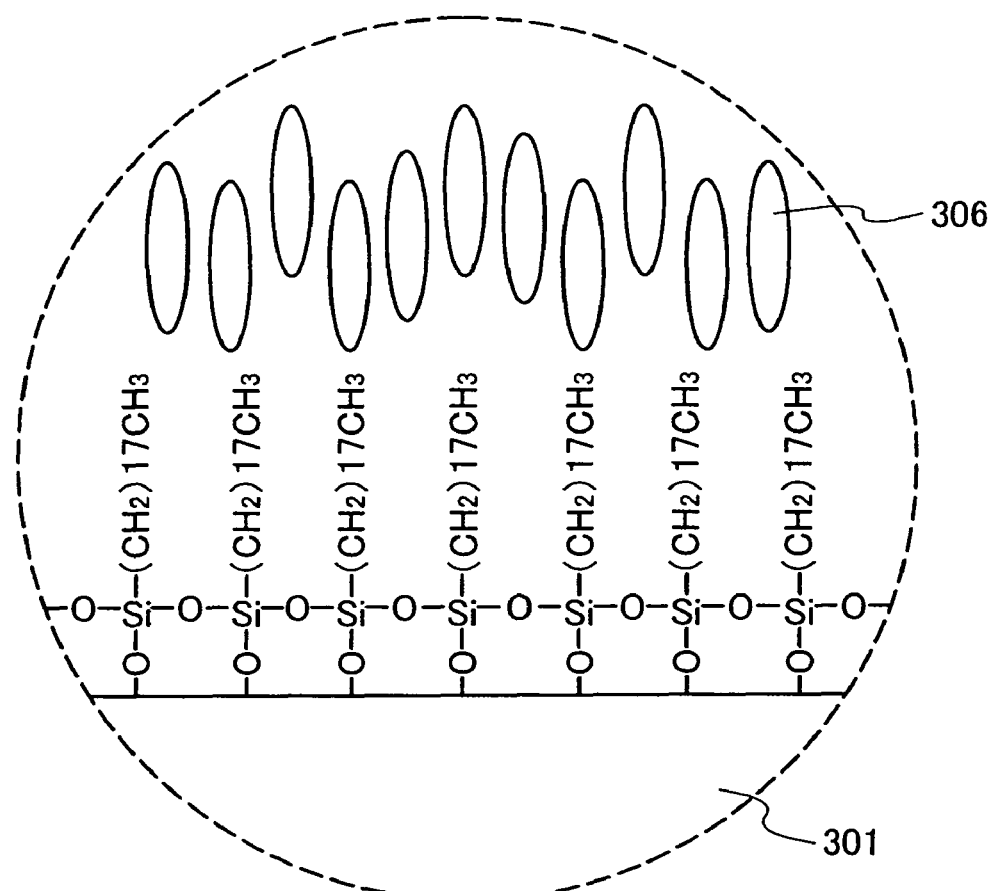

An example of a cross-sectional view of the liquid crystal panel obtained through the above steps is shown in FIGS. 2A and 2B.

FIG. 2A shows a structure in which a liquid crystal layer 303 is interposed in a region surrounded by a first substrate 300, a second substrate 305, and a seal 302. A pixel electrode 301 made of a transparent conductive layer such as an ITO (indium tin oxide) layer, an indium zinc oxide ($In_2O_3$—ZnO) layer, or a zinc oxide (ZnO) layer is formed over the first substrate, and an opposite electrode 304 made of a transparent conductive layer such as an ITO layer, an indium zinc oxide ($In_2O_3$—ZnO) layer, or a zinc oxide (ZnO) layer is formed over the second substrate.

Note that monolayers are formed adjacent to portions where the liquid crystal layer 303 is in contact with the pixel electrode 301 and the opposite electrode 304. FIG. 2B shows an enlarged model diagram of the vicinity of the pixel electrode. Due to the existence of the monolayer, long axes of liquid crystal molecules 306 of the liquid crystal layer 303 are aligned perpendicularly to a substrate surface. As shown in FIG. 2B, a substantial monolayer of molecules is formed, in which one end of each molecule is bonded to the pixel electrode and the other end functions to contribute to alignment of liquid crystal molecules.

In addition, the following experiment was carried out.
(Experiment 1)

Figure 3A:
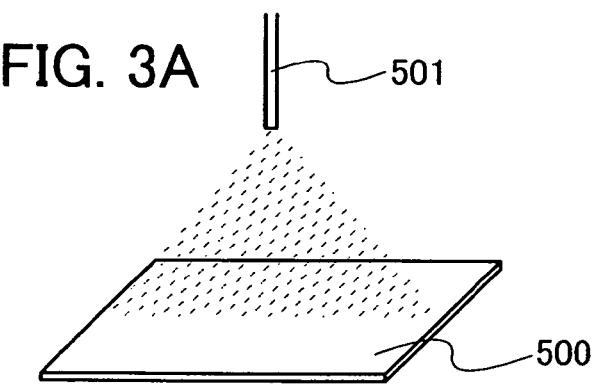
FIGS. 3A to 3D are diagrams showing a manufacturing procedure of an evaluation liquid crystal element.
Figure 3B:
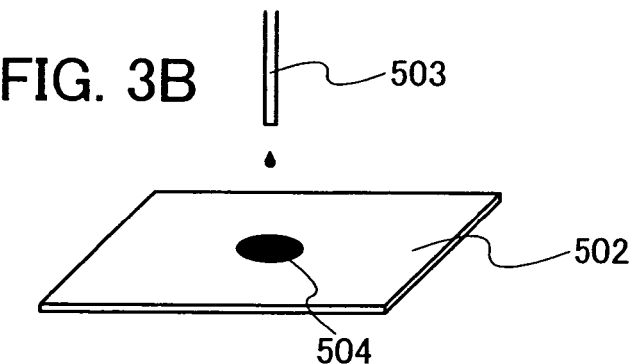
Figure 3C:
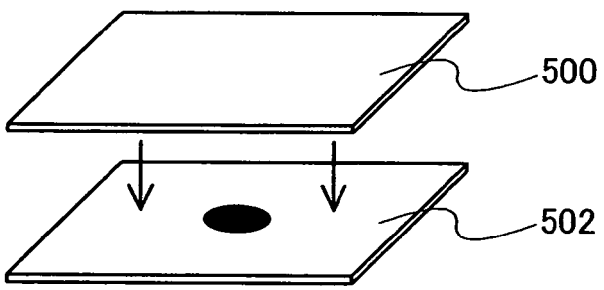
Figure 3D:
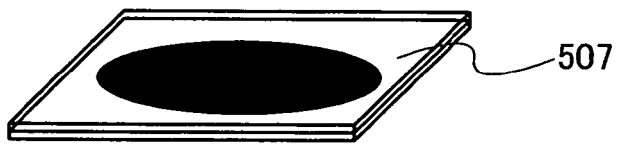

FIGS. 3A to 3D show a manufacturing process for an evaluation liquid crystal element. First, a spherical spacer (a bead spacer with a diameter of 1.9 μm) was sprayed using a spray nozzle 501 over a first substrate 500 which was provided with a transparent electrode (ITO) as shown in FIG. 3A. Next, a mixture 504 of VA mode liquid crystal (MLC 2038) in which octadecyltrimethoxysilane (hereinafter referred to as ODS) of 10 wt % was dispersed was dropped from a dropping nozzle 503 to a surface of a second substrate 502 which was provided with a transparent electrode (ITO), as shown FIG. 3B. Then, the first substrate and the second substrate were attached to each other as shown in FIG. 3C. At that time, a gap between the pair of substrates was maintained with the spherical spacer. A liquid crystal element 507 manufactured as described above and shown in FIG. 3D was an evaluation element. The structure of the evaluation liquid crystal element manufactured as described above is similar to that in FIGS. 2A and 2B.

Note that after mixing ODS into liquid crystal, the mixture was heated to an NI point (that is, an isotropic phase) or more while stirring to disperse ODS in the liquid crystal. Although the mixture was heated to an NI point (that is, an isotropic phase) or more in this experiment, stirring while heating is not necessarily performed and only stirring at room temperature may be performed.

Figure 4:
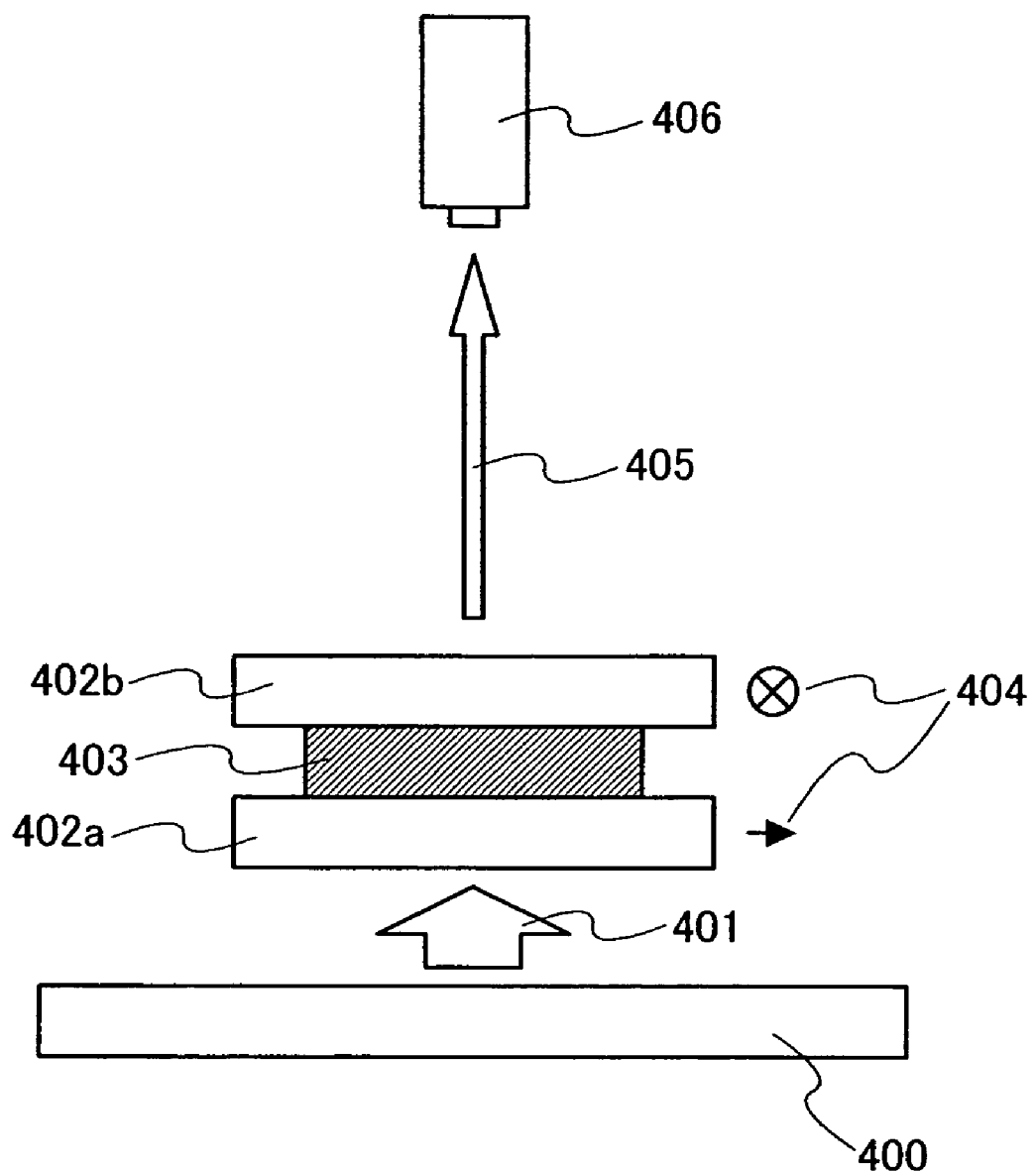
FIG. 4 is a diagram showing a measuring method.

The evaluation liquid crystal element manufactured as described above was evaluated by a system of measurement shown in FIG. 4. An evaluation liquid crystal element 403 was sandwiched between a first polarizing plate 402a and a second polarizing plate 402b; light 401 from a backlight 400 was used; and transmitted light 405 was measured by a luminance meter 406. Note that the first polarizing plate 402a and the second polarizing plate 402b are in a cross nicol state in which polarizing axes are perpendicular to each other as indicated by 404. Thus, transmitted light luminance of the evaluation liquid crystal element using the first polarizing plate 402a and the second polarizing plate 402b in a cross nicol state at the time of application of 0 V was measured by the luminance meter 406. As a result of measurement, transmitted light luminance was approximately 0.6 cd/m$^2$ and favorable vertical alignment with no dropping mark, flow unevenness, and the like was exhibited.

EMBODIMENT MODE 2

Here, explained is an example of performing seal drawing on a first substrate side and injecting liquid crystal after attaching a pair of substrates to each other. The flow of panel manufacturing is explained below.

First, a second substrate 220 serving as an opposite substrate and a first substrate 210 provided with TFTs (not shown) in advance are prepared as shown in FIG. 5A-1 and FIG. 5A-2. Note that an opposite electrode 222 made of a transparent conductive film is formed over the second substrate 220, and a pixel electrode 211 made of a transparent conductive film is formed over the first substrate 210 in advance.

Next, a spherical spacer 215 is sprayed over the second substrate 220, and a sealant 212 is drawn over the first substrate 210 as shown in FIG. 5B-1 and FIG. 5B-2. Although the sealant 212 is arranged so as to surround a display region, the sealant 212 is not arranged in a portion later serving as an inlet (not shown here) for injecting liquid crystal. At this point, the sealant is temporarily baked.

After that, the first substrate 210 and the second substrate 220 are attached to each other as shown in FIG. 5C.

Then, the sealant 212 is cured by performing ultraviolet ray irradiation or heat treatment (FIG. 5D).

Next, the substrates are divided using a cutting apparatus such as a scriber apparatus, a breaker apparatus, or a roll cutter so that the inlet for injecting liquid crystal is located at an end face or a corner of the substrates.

Then, a portion of both substrates (including a corner portion), typically, one end (hereinafter simply referred to as an end or an edge) is soaked in a liquid including a mixture of a liquid crystal material and a silane coupling agent, and the mixture 214 of a liquid crystal material and a silane coupling agent is injected by a capillary phenomenon with respect to this gap.

Alternatively, a liquid crystal element may be manufactured by dropping the liquid including a mixture of a liquid crystal material and a silane coupling agent into the inlet for injecting liquid crystal and injecting the mixture to be drawn into this gap.

Note that moisture or the like which does not contribute to hydrolysis of a silane coupling agent leads to a decrease of voltage holding characteristics. Accordingly, the injection step is preferably performed in an anaerobic atmosphere to avoid excessive entrance and the like of an impurity such as moisture from the atmosphere. The anaerobic atmosphere is an atmosphere excluding moisture and oxygen, for example, an inert gas atmosphere such as nitrogen or argon. Further, the atmosphere may be a reduced-pressure atmosphere once in order to remove moisture and oxygen and then may be changed to an atmosphere supplied with an inert gas.

Lastly, the inlet for injecting liquid crystal is sealed with an adhesive.

According to the above steps, the mixture 214 of a liquid crystal material and a silane coupling agent can be held between the pair of substrates as shown in FIG. 5E.

In addition, an experiment described below was carried out.
(Experiment 2)

A pair of substrates each provided with a transparent electrode (ITO) was attached to each other using a thermosetting seal. In addition, a bead spacer with a diameter of 1.9 μm was dispersed in the seal to maintain a distance between the substrates, which was used as an evaluation element.

After that, liquid crystal in which ODS of 0 wt % to 10 wt % was dispersed was injected between the pair of substrates and heated at 130° C. for one hour, thereby performing realignment treatment. ODS dispersed in liquid crystal adsorbs to an interface of ITO or a substrate after the injection and forms a self-assembled monolayer. The structure of the evaluation liquid crystal element manufactured as described above is similar to that in FIGS. 2A and 2B.

Figure 6:
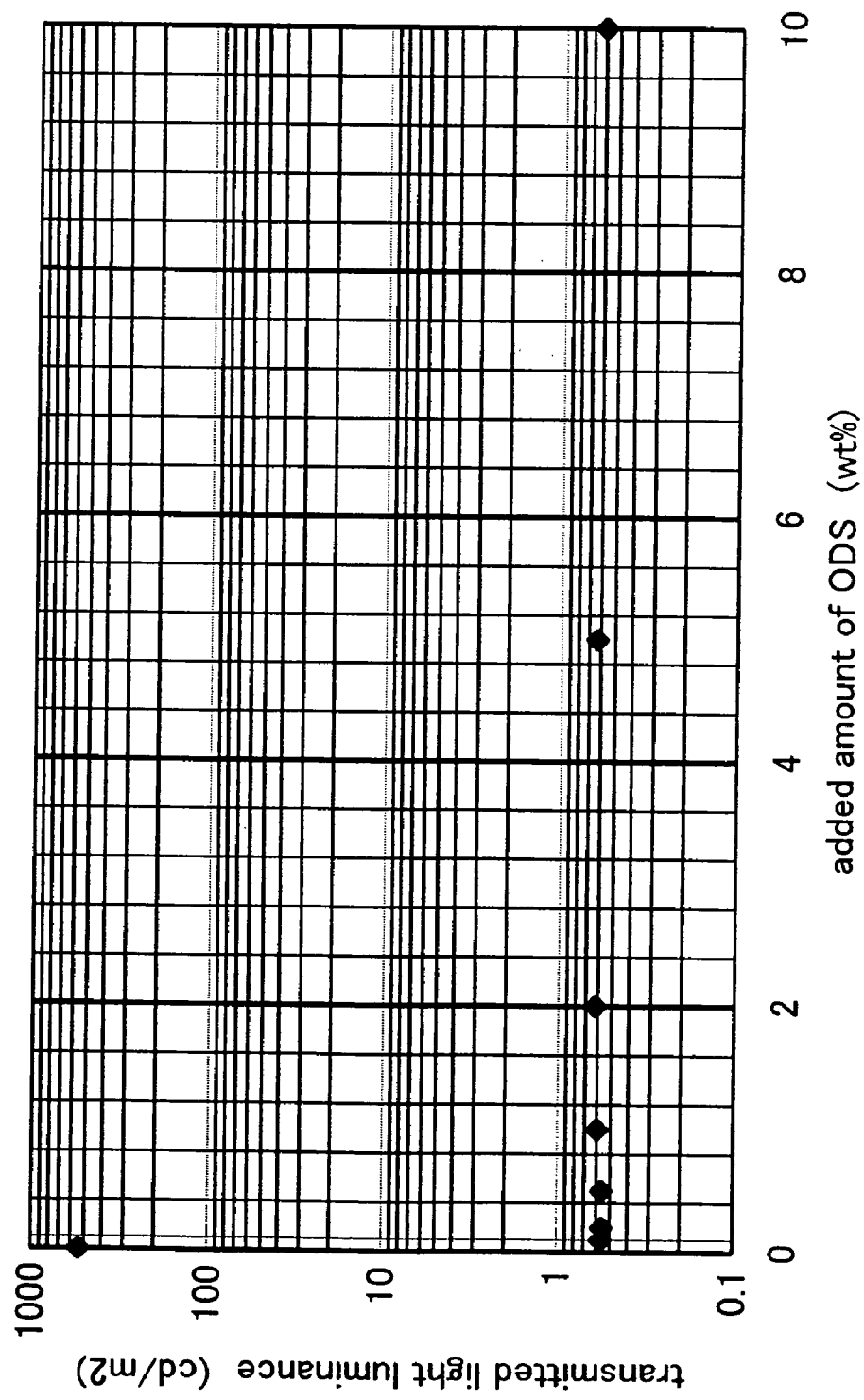
FIG. 6 is a graph showing a transmitted light luminance characteristic.

The evaluation liquid crystal element manufactured as described above was evaluated under similar conditions to those of Experiment 1 by the system of measurement shown in FIG. 4. A result of transmitted light luminance characteristic is shown in FIG. 6. In a comparative example in which only liquid crystal was injected without adding ODS, horizontal alignment was exhibited and a transmitted light luminance was 538.6 cd/m$^2$. Meanwhile, in the case of the present invention where ODS is added, it is found that a transmitted light luminance is approximately 0.6 cd/m$^2$ regardless of the added amount of ODS and favorable vertical alignment is exhibited.

In Experiment 2 described above, favorable vertical alignment was exhibited and its effect could be confirmed even with an added amount of ODS of 0.1 wt %.

In addition, the following experiment was carried out.
(Experiment 3)

A pair of substrates each provided with a transparent electrode (ITO) was attached to each other using a thermosetting seal. A bead spacer with a diameter of 1.9 μm was dispersed in the seal to maintain a substrate gap, and this was used as an evaluation element. After that, liquid crystal (MLC 2038) in which ODS of 10 wt % was dispersed was injected between the pair of substrates and heated at 130° C. for one hour, thereby performing realignment treatment.

In this experiment, a mixture was obtained by adding water to a liquid crystal material when adding ODS of 10 wt % and by stirring them. Conditions were set by setting the added amount of water to 0, 0.1 wt %, 1 wt %, 2 wt %, and 10 wt %, and a voltage holding ratio and transmitted light intensity were measured in each case. Note that a mixture with an added amount of water of 0 contains a minute mount of water from 0.0001 wt % to 0.001 wt % in the case of MLC 2038 and contributes to a reaction for forming a self-assembled monolayer.

A measurement result of this experiment is shown in Table 1.

TABLE 1

| the added amount of water wt % | cd/m2 | VHR % |
|---|---|---|
| 0 | 0.4974 | 100 |
| 0.1 | 0.5728 | 99 |
| 1 | 0.5284 | 99 |
| 2 | 0.4793 | 72 |
| 10 | 0.4785 | 4 |

Figure 12:
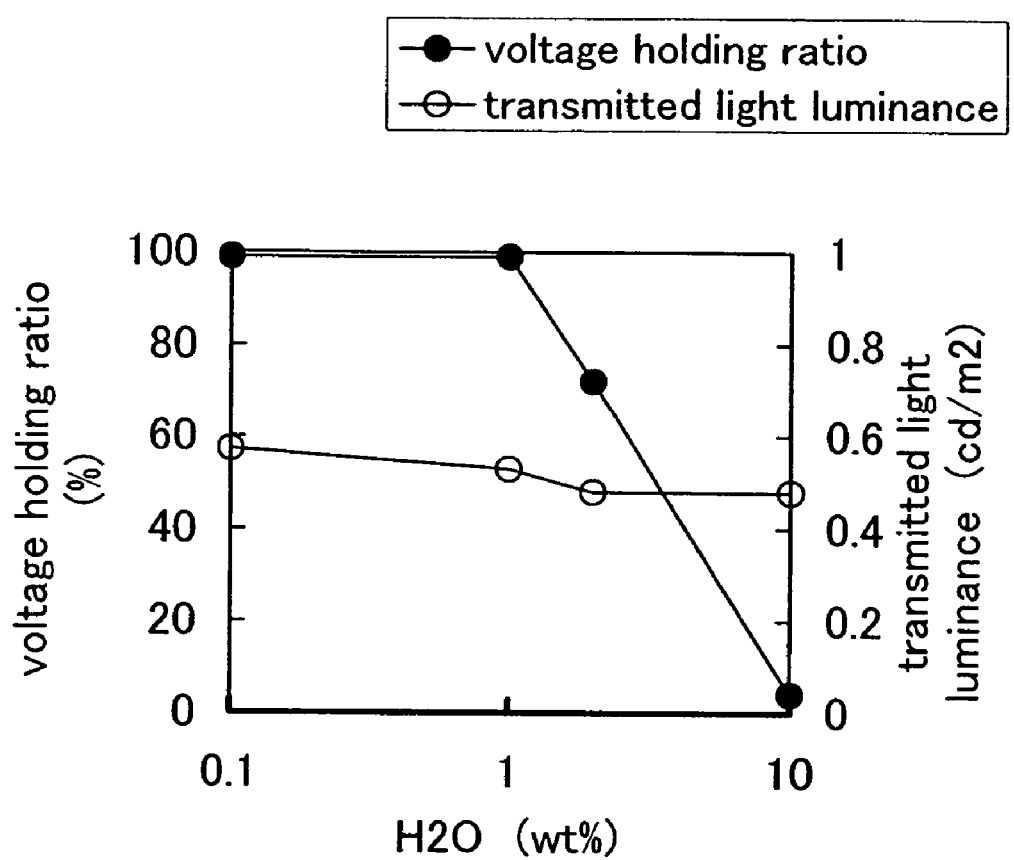
FIG. 12 is a graphical diagram showing a relation between the added amount of water and a voltage holding ratio.

FIG. 12 shows a graph of the measurement result.

It is found that a voltage holding ratio is decreased as shown in FIG. 12 when moisture of more than 1 wt % is added.

It can be said from this experiment that when adding water, the amount is preferably 1 wt % or less. Note that although water was used in this experiment, the present invention is not limited. A solvent such as alcohol or ketone may be added to promote hydrolysis of a silane coupling agent. In the case where a liquid crystal material with a moisture content of less than 1 ppm can be purified and liquid crystal injection and liquid crystal dropping can be performed in the anaerobic atmosphere, a self-assembled monolayer is not formed even when a silane coupling agent is mixed. Therefore, in the case of using a liquid crystal material with a moisture content of less than 1 ppm, it is preferable to intentionally add a solvent such as moisture which promotes hydrolysis to a liquid crystal material with an amount of 0.0001 wt % to 1 wt %.

The present invention having the above structure is explained more specifically in embodiments to be described below.

EMBODIMENT 1

Figure 7:
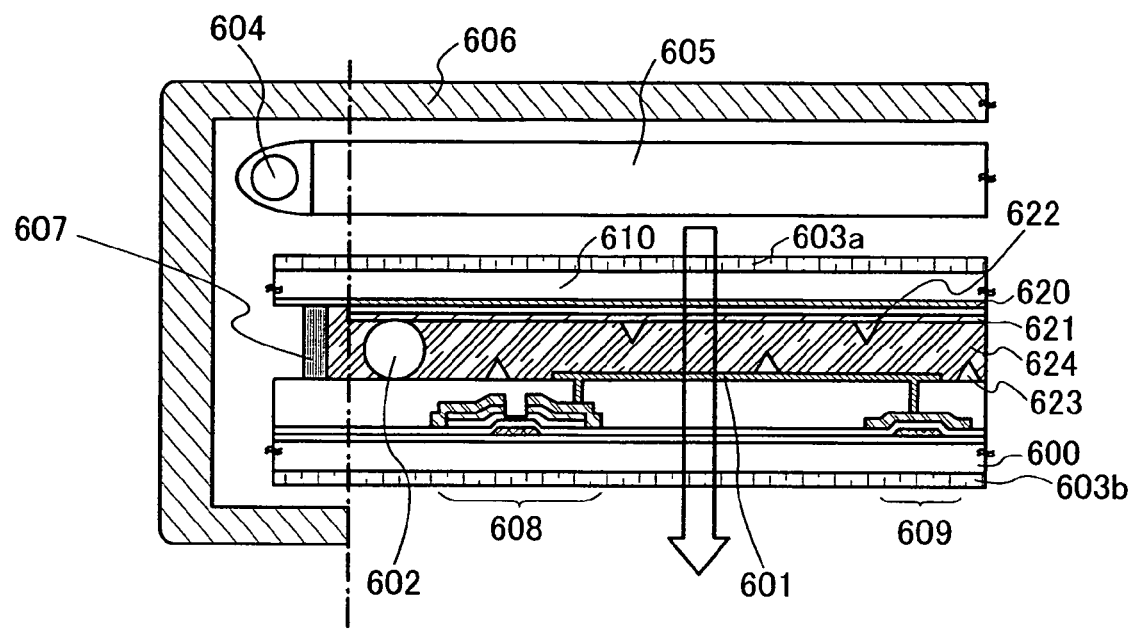
FIG. 7 is a cross-sectional structure diagram of an active matrix liquid crystal display device.

This embodiment describes a manufacturing process for an active matrix liquid crystal display device with reference to FIG. 7.

First, an active matrix substrate is manufactured using a substrate 600 having a light transmitting property. Manufacturing cost is preferably reduced by using a large-area substrate having a size of, for example, 600 mm×720 mm, 680 mm×880 mm, 1000 mm×1200 mm, 1100 mm×1250 mm, 1150 mm×1300 mm, 1500 mm×1800 mm, 1800 mm×2000 mm, 2000 mm×2100 mm, 2200 mm×2600 mm, or 2600 mm×3100 mm. As for the substrate, a glass substrate of barium borosilicate glass, alumino borosilicate glass, or the like typified by #7059 glass, #1737 glass, or the like manufactured by Corning, Inc. can be used. As another example of the substrate, a light-transmitting substrate such as a quartz substrate or a plastic substrate can be used.

First, a conductive layer is formed entirely over the substrate 600 having an insulating surface by using a sputtering method. After that, a resist mask is formed by performing a first photolithography step, and an unnecessary portion is removed by etching to form a wire and an electrode (such as a gate electrode, a storage capacitor wire, and a terminal). Note that a base insulating film is formed over the substrate 600 if necessary.

The wire and the electrode are formed using an element selected from Ti, Ta, W, Mo, Cr, and Nd, an alloy containing the element as a component, or nitride containing the element as a component. Further, two or more of elements selected from Ti, Ta, W, Mo, Cr, and Nd, an alloy containing the element as a component, and nitride of the element as a component may be stacked.

As a screen size is increased, the length of each wire is increased, and the problem of an increase in wire resistance is caused, which causes an increase in power consumption. Therefore, in order to decrease wire resistance and reduce power consumption, Cu, Al, Ag, Au, Cr, Fe, Ni, Pt, or an alloy thereof can be used as materials of the above wire and electrode. Alternatively, the wire and the electrode may be formed by an ink-jet method using an independently dispersed ultrafine particle dispersion liquid in which ultrafine particles (each with a grain size of 5 nm to 10 nm) of metal such as Ag, Au, Cu, or Pd are dispersed at high concentration without being aggregated.

Next, a gate insulating film is entirely formed by a PCVD method. The gate insulating film is formed using a stacked layer of a silicon nitride film and a silicon oxide film with a total thickness of 50 nm to 200 nm, preferably 150 nm. Note that the gate insulating film is not limited to a stacked layer, and an insulating film such as a silicon oxide film, a silicon nitride film, a silicon oxynitride film, or a tantalum oxide film can be used.

Then, a first amorphous semiconductor film is formed entirely over the gate insulating film with a thickness of 50 nm to 200 nm, preferably 100 nm to 150 nm by a method such as a plasma CVD method or a sputtering method. Typically, an amorphous silicon (a-Si) film is formed with a thickness of 100 nm. Note that since a chamber size is increased when forming a film over a large-area substrate, it takes long time to evacuate the chamber and requires a large amount of film formation gas. Therefore, further cost reduction may be achieved by forming the amorphous silicon (a-Si) film using a linear plasma CVD apparatus under atmospheric pressure.

After that, a second amorphous semiconductor film containing an impurity element imparting one conductivity type (n-type or p-type) is formed with a thickness of 20 nm to 80 nm. The second amorphous semiconductor film containing an impurity element imparting one conductivity type (n-type or p-type) is entirely formed by a method such as a plasma CVD method or a sputtering method. In this embodiment, the second amorphous semiconductor film containing an impurity element imparting n-type conductivity is formed using a silicon target to which phosphorus is added.

Next, a resist mask is formed by a second photolithography step, and an unnecessary portion is removed by etching to form a first island-shaped amorphous semiconductor film and a second island-shaped amorphous semiconductor film. Wet etching or dry etching is used as an etching method at this time.

Then, a conductive layer covering the second island-shaped amorphous semiconductor film is formed by a sputtering method. After that, a resist mask is formed by performing a third photolithography step, and an unnecessary portion is removed by etching to form a wire and an electrode (such as a source wire, a drain electrode, and a storage capacitor electrode). The above wire and electrode are formed using an element selected from Al, Ti, Ta, W, Mo, Cr, Nd, Cu, Ag, Au, Cr, Fe, Ni, and Pt or an alloy containing the element as a component. Alternatively, the wire and the electrode may be formed by an ink-jet method using an independently dispersed ultrafine particle dispersion liquid in which ultrafine particles (each with a grain size of 5 nm to 10 nm) of metal such as Ag, Au, Cu, or Pd are dispersed at high concentration without being aggregated. By forming the wire and the electrode by an ink jet method, the photolithography step becomes unnecessary and a further cost reduction can be achieved.

Next, a resist mask is formed by a fourth photolithography step, and an unnecessary portion is removed by etching to form a source wire, a drain electrode, and a capacitor electrode. Wet etching or dry etching is used as an etching method at this time. At this stage, a storage capacitor is formed which uses as a dielectric an insulating film made of the same material as the gate insulating film. Then, using the source wire and the drain electrode as masks, a part of the second amorphous semiconductor film is removed in a self-aligned manner and a part of the first amorphous semiconductor film is thinned. The thinned region serves as a channel formation region of a TFT.

After that, a first protective film made of a silicon nitride film with a thickness of 150 nm and a first interlayer insulating film made of a silicon oxynitride film with a thickness of 150 nm are entirely formed by a plasma CVD method. Note that since a chamber size is increased when forming a film over a large-area substrate, it takes long processing time to evacuate the chamber and requires a large amount of film formation gas. Therefore, a further cost reduction may be achieved by forming the protective film made of a silicon nitride film using a linear plasma CVD apparatus under atmospheric pressure. After this, hydrogenation is performed and a channel-etch TFT 608 is manufactured.

Although the channel etch type is given in this embodiment as an example of the structure of the TFT 608, the TFT structure is not particularly limited and may be a channel stopper TFT, a top gate TFT, or a staggered TFT. In addition, although the case of using an amorphous silicon film as a semiconductor layer of the TFT 608 is described in this embodiment as an example, there is no particular limitation. A polysilicon film, an organic semiconductor film (such as polythiophene, polyfluorene, poly(3-alkylthiophene), a polythiophene derivative, or pentacene) or a semiconductor film containing metal oxide as its main component (such as zinc oxide (ZnO) or oxide of zinc, gallium, and indium (In—Ga—Zh—O)) may be used. Since high field effect mobility is obtained in the case of forming the TFT using a polysilicon film, a driver circuit can also be formed over the same substrate as the TFT of a pixel portion.

Next, a resist mask is formed by performing a fifth photolithography step, and contact holes reaching the drain electrode and the storage capacitor electrode are then formed by a dry etching step. At the same time, a contact hole (not shown) for electrically connecting the gate wire and a terminal portion may be formed in a terminal portion, and a metal wire (not shown) which electrically connects the gate wire and the terminal portion may be formed. In addition, at the same time, a contact hole (not shown) reaching the source wire may be formed, and a metal wire for leading from the source wire may be formed. A pixel electrode of ITO or the like may be formed after forming these metal wires, or these metal wires may be formed after forming the pixel electrode of ITO or the like.

Then, a transparent electrode film is formed of ITO (indium tin oxide), indium zinc oxide ($In_2O_3$—ZnO), zinc oxide (ZnO), or the like with a thickness of 110 nm. After that, a pixel electrode 601 is formed by performing a sixth photolithography step and an etching step.

As described above, an active matrix substrate including the source wire, the inverted staggered TFT and the storage capacitor 609 in the pixel portion, and the terminal portion can be manufactured in the pixel portion by the six photolithography steps.

Next, a rib 623 is formed for aligning liquid crystal molecules. As the rib 623, an organic resin (such as acryl, polyimide, polyimide amide, or epoxy) or an inorganic insulating material (such as silicon oxide, silicon nitride, or silicon oxynitride) is used.

Then, an opposite substrate 610 is prepared. This opposite substrate 610 is provided with a color filter (CF) 620 in which a colored layer and a light blocking layer are arranged in accordance with each pixel. In addition, a planarizing film is provided to cover the color filter and the light blocking layer. Then, an opposite electrode 621 is formed of a transparent conductive film in a position overlapping with the pixel portion over the planarizing film. Then, a rib 622 is formed over the opposite substrate.

Next, a sealant 607 is drawn over the opposite substrate 610. The sealant 607 is mixed with filler (not shown), so that two substrates can be attached to each other in a subsequent step with a uniform gap therebetween. The sealant 607 is drawn to surround the pixel portion when attached to the active matrix substrate.

Then, a spherical spacer 602 is sprayed entirely over the active matrix substrate in order to maintain a substrate gap. Instead of the spherical spacer, a columnar spacer which can be obtained by selectively etching an organic resin film such as an acrylic resin film may be formed in a desired position.

After that, either a step of injecting liquid crystal after attaching the pair of substrates to each other or a step of attaching the pair of substrates to each other after dropping liquid crystal is performed. In this embodiment, the pair of substrates is attached to each other under reduced pressure after dropping a mixture including a liquid crystal material and a silane coupling agent as described in Embodiment Mode 1. Thus, a mixture 624 of a liquid crystal material and a silane coupling agent is held between the pair of substrates. By using a method for dropping the mixture including a liquid crystal material and a silane coupling agent, the amount of the mixture used in the manufacturing process can be reduced. In particular, a significant cost reduction can be achieved when using a large-area substrate. When the mixture is injected, self-assembled monolayers (not shown) are formed adjacent to the pixel electrode 601 and the opposite electrode 621. The liquid crystal molecules are vertically aligned by these self-assembled monolayers and the ribs 622 and 623.

In the case of injecting the mixture including a liquid crystal material and a silane coupling agent after attaching the pair of substrates to each other, the inlet is sealed after injection using a vacuum injection method as described in Embodiment Mode 2. Note that since the flow of liquid crystal at the time of injection may remain as flow alignment, realignment treatment is preferably performed by heating (for example at 100° C. for 10 minutes).

In this manner, the active matrix liquid crystal panel is completed. Then, the active matrix substrate or the opposite substrate is divided into a desired shape, if necessary. Furthermore, an optical film such as polarizing plates 603*a* and 603*b* is appropriately provided using a known technique. Note that the polarizing plate 603*a* provided over the opposite substrate is arranged so that a polarizing axis thereof is perpendicular to that of the polarizing plate 603*b* provided over the active matrix substrate. Then, an FPC is attached using a known technique.

The liquid crystal module obtained through the above steps is provided with a backlight 604 using a cold cathode tube or the like as a light source and a light conducting plate 605 and covered with a cover 606, thereby completing the active matrix liquid crystal display device (transmissive type), a partial cross-sectional view of which is shown in FIG. 7. Note that the cover and the liquid crystal module are fixed using an adhesive or an organic resin. In addition, since the liquid crystal display device is of transmissive type, polarizing plates are attached to both the active matrix substrate and the opposite substrate.

Figure 8A:
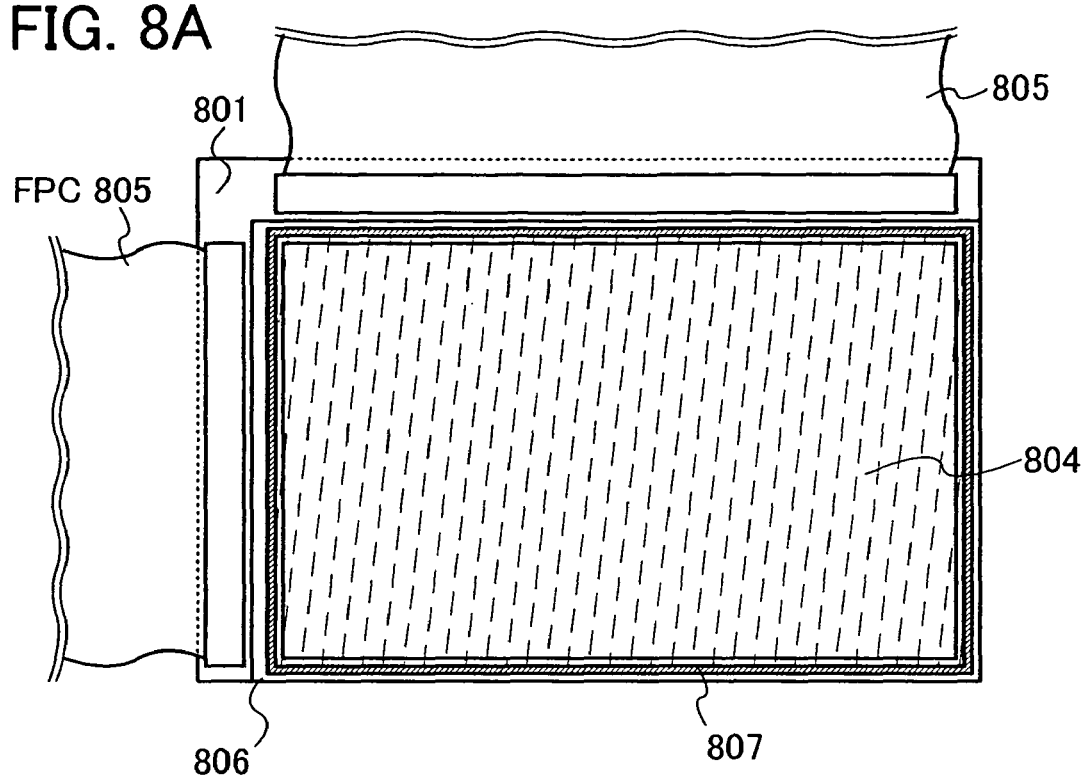
FIGS. 8A and 8B are diagrams each showing a top view of a liquid crystal module.
Figure 8B:
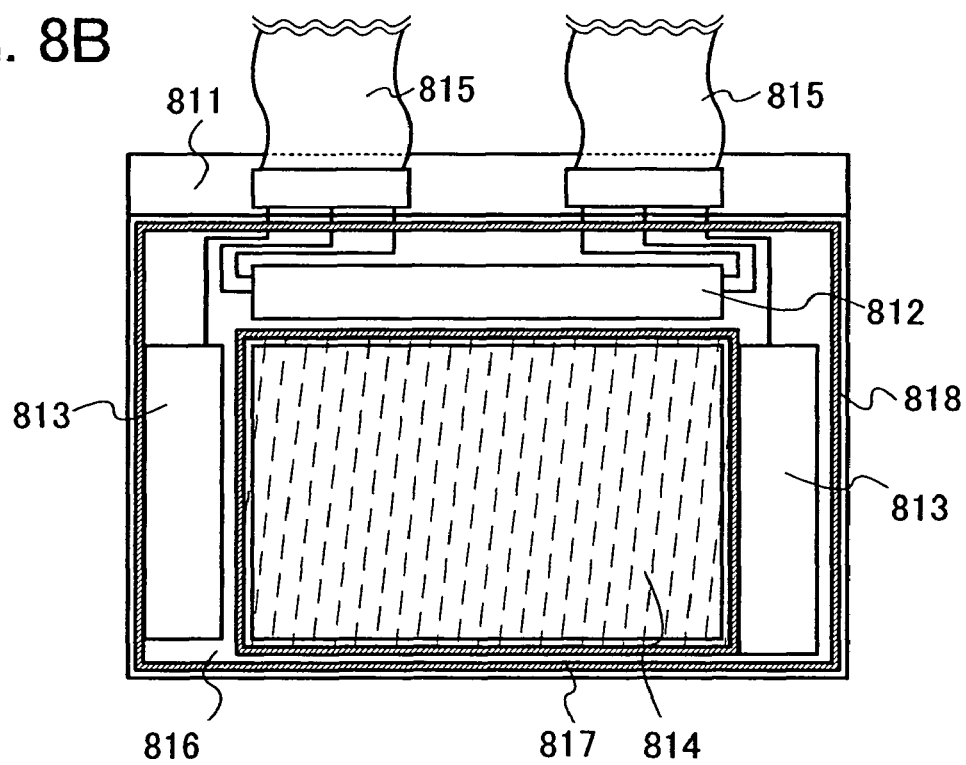

A top view of the liquid crystal module is shown in FIG. 8A, and an example of a top view of another liquid crystal module is shown in FIG. 8B.

The TFT 608 of which active layer is formed of an amorphous semiconductor film (an amorphous silicon film) described in this embodiment has low field-effect mobility, approximately only 1 $cm^2$/Vsec. Therefore, a driver circuit for performing image display is formed as an IC chip and mounted by a TAB (Tape Automated Bonding) or a COG (Chip On Glass) method.

In FIG. 8A, a reference numeral 801 denotes an active matrix substrate; 806, an opposite substrate; 804, a pixel portion; 807, a sealant; and 805, an FPC. Note that a mixture of a liquid crystal material and a silane coupling agent is dropped and the pair of substrates 801 and 806 is attached to each other under reduced pressure in this embodiment; therefore, the sealant 807 has a closed shape as shown in FIG. 8A.

In the case of using a TFT having an active layer made of a polysilicon film, a part of a driver circuit can be manufactured, and a liquid crystal module as shown in FIG. 8B can be manufactured. Note that a driver circuit which cannot be formed using the TFT having an active layer made of a polysilicon film is mounted as an IC chip (not shown).

In FIG. 8B, a reference numeral 811 denotes an active matrix substrate; 816, an opposite substrate; 812, a source signal line driver circuit; 813, a gate signal line driver circuit; 814, a pixel portion; 817, a first sealant; and 815, an FPC. Note that a mixture of a liquid crystal material and a silane coupling agent is dropped, and the pair of substrates 811 and 816 is attached to each other with the first sealant 817 and the second sealant 818. Since liquid crystal is not necessary for a driver circuit portion including the source signal line driver circuit 812 and the gate signal line driver circuit 813, liquid crystal is held only in the pixel portion 814 and the second sealant 818 is provided for reinforcement of the whole panel.

This embodiment can be freely combined with Embodiment Mode 1 or 2.

EMBODIMENT 2

Figure 9:
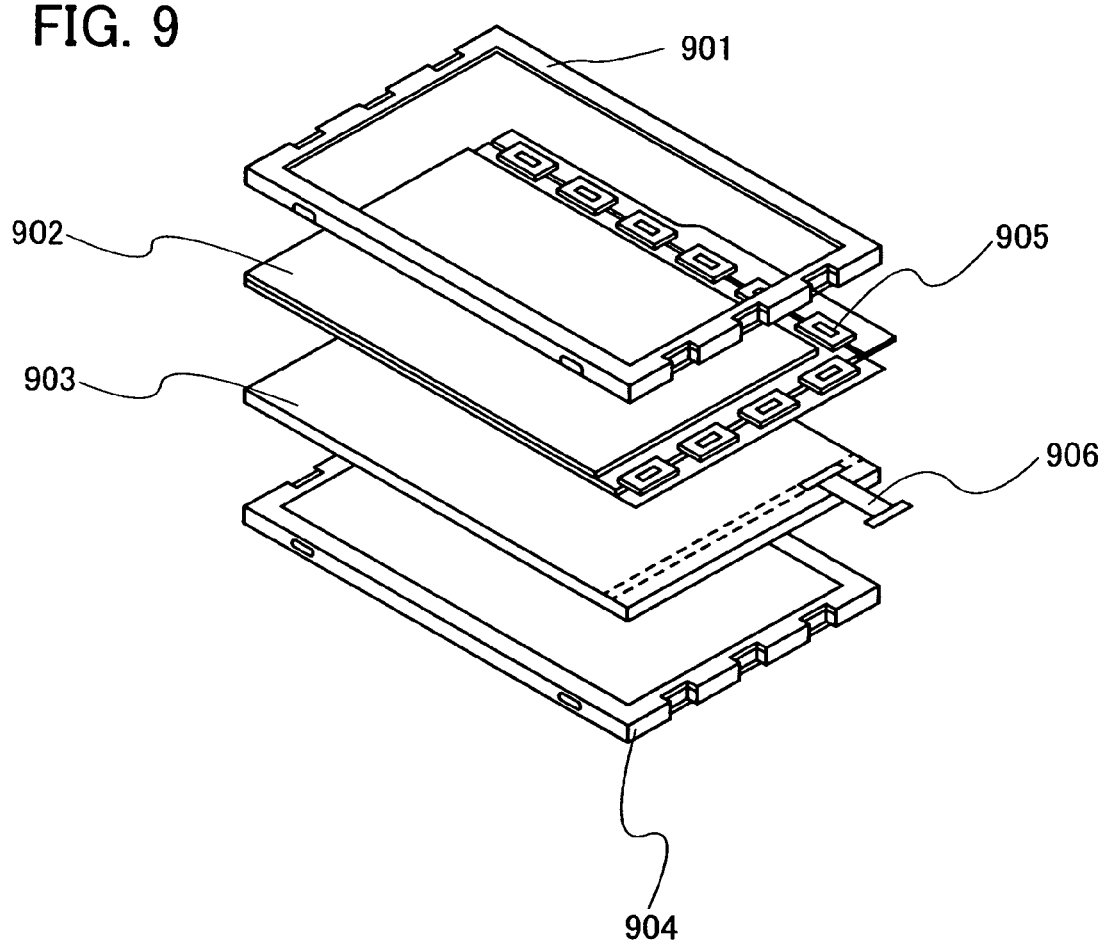
FIG. 9 is a diagram showing a perspective view of a liquid crystal module.

Although Embodiment 1 describes an example of a liquid crystal display device using a backlight having a cold cathode tube or the like as a light source and a light conducting plate, this embodiment describes an example of using a backlight having an LED (light emitting diode) as a light source with reference to FIG. 9.

FIG. 9 is a perspective view of the liquid crystal display device using an LED as a backlight. The liquid crystal display device shown in FIG. 9 includes a chassis 901, a liquid crystal layer 902, a backlight 903, and a chassis 904, and the liquid crystal layer 902 is connected to a driver IC 905. The backlight 903 uses a number of LEDs and is supplied with current through a terminal 906. In addition, either an inorganic material or an organic material may be used as a light emitting material of the LED.

Note that one kind of an LED which emits white light may be used, or three kinds of LEDs which respectively emit red, blue, and green light may be used. When using three kinds of LEDs which emit red, blue, and green light, the use of a color filter can be eliminated by a technique called a field sequential method for performing full color display by blinking three kinds of LEDs at high speed and alternately and turning on/off a liquid crystal shutter in accordance with the blinking timing.

The use of an LED as a backlight of a liquid crystal display device can provide a backlight which consumes less power. In addition, since the LED is a plane-emission lighting system and the area thereof can be increased, an area of a backlight can be increased and an area of a liquid crystal display device can also be increased. Further, since the LED is thin and consumes less power, the thickness and power consumption of the display device can also be reduced.

This embodiment can be freely combined with Embodiment Mode 1 or 2, or Embodiment 1.

EMBODIMENT 3

Examples of liquid crystal display devices and electronic devices of the present invention are as follows: a camera such as a video camera or a digital camera, a goggle type display (head mounted display), a navigation system, a sound reproduction device (a car audio, an audio component, or the like), a computer, a game machine, a mobile information terminal (a mobile computer, a mobile telephone, a mobile game machine, an electronic book, or the like), an image reproduction device equipped with a recording medium (specifically a device which reproduces the recording medium such as a digital versatile disc (DVD) and which is equipped with a display for displaying the image), and the like. In particular, the present invention is preferably used for a large-sized television having a large-sized screen, and the like. Specific examples of those electronic devices are shown in FIGS. 10A to 11.

Figure 10A:
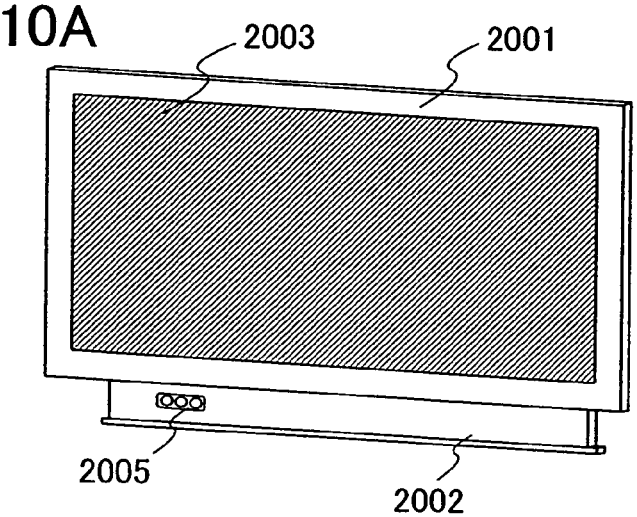
FIGS. 10A to 10D are diagrams showing examples of electronic devices.
Figure 11:
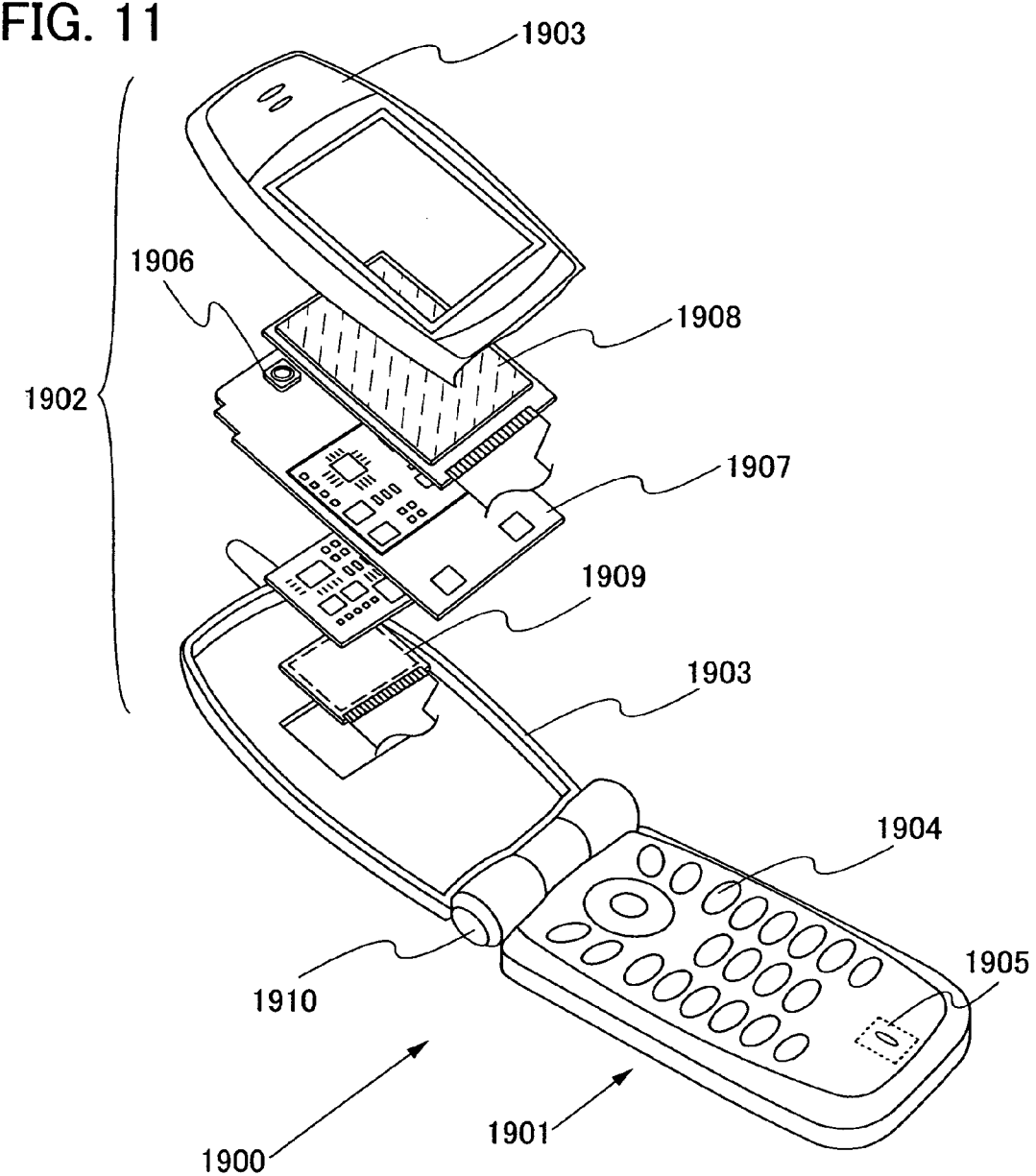
FIG. 11 is a diagram showing an example of an electronic device.

FIG. 10A shows a large-sized display device having a 22-inch to 50-inch large screen, which includes a chassis 2001, a support 2002, a display portion 2003, a video input terminal 2005, and the like. Note that the display device includes all display devices for displaying information such as for a personal computer, TV broadcast reception, and interactive TV. The present invention can realize a relatively inexpensive large-sized display device even when using a glass substrate of or after the fifth generation having a side of more than 1000 mm.

Figure 10B:
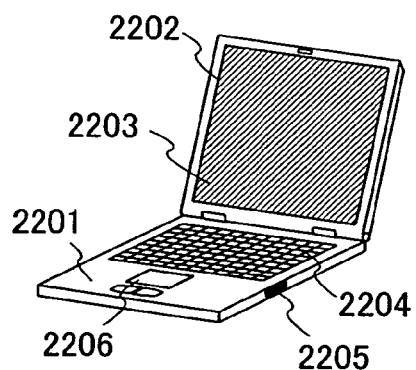

FIG. 10B shows a notebook personal computer, which includes a main body 2201, a chassis 2202, a display portion 2203, a keyboard 2204, an external connection port 2205, a pointing mouse 2206, and the like. The present invention can realize a relatively inexpensive notebook personal computer.

Figure 10C:
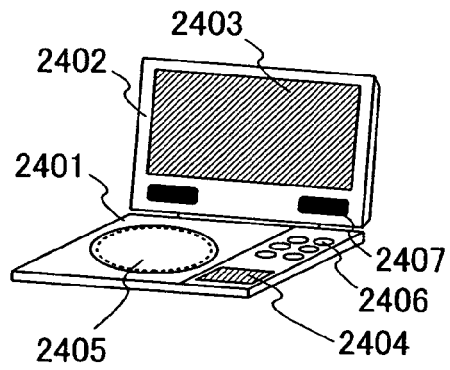

FIG. 10C shows a portable image reproduction device equipped with a recording medium (specifically, a DVD reproduction device), which includes a main body 2401, a chassis 2402, a display portion A 2403, a display portion B 2404, a recording medium (DVD or the like) reading portion 2405, an operation key 2406, a speaker portion 2407, and the like. The display portion A 2403 mainly displays image information, and the display portion B 2404 mainly displays character information. Note that the image reproduction device equipped with a recording medium includes a home-use game machine and the like. The present invention can realize a relatively inexpensive image reproduction device.

Figure 10D:
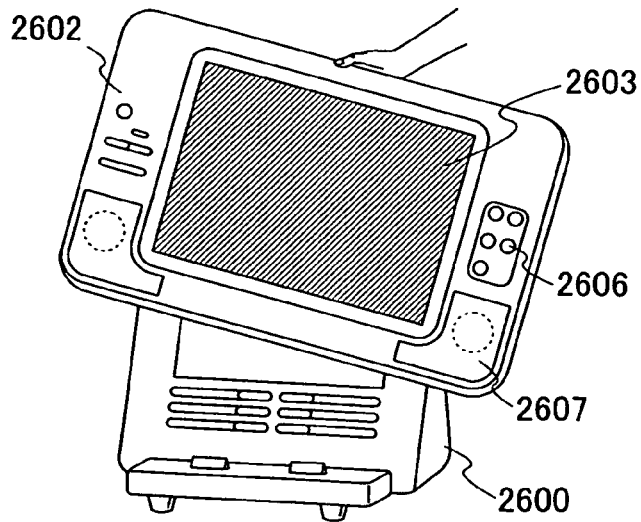

FIG. 10D shows a TV, only a display of which can be carried wirelessly. A chassis 2602 incorporates a battery and a signal receiver, and a display portion 2603 and a speaker portion 2607 are driven by the battery. The battery can be charged repeatedly by using a battery charger 2600. The battery charger 2600 can send and receive video signals, which can be sent to the signal receiver of the display. The chassis 2602 is controlled by an operation key 2606. Since the device shown in FIG. 10D can transmit signals from the chassis 2602 to the battery charger 2600 by operating the operation key 2606, it can also be referred to as a video and audio interactive communication device. In addition, since the device can transmit signals from the chassis 2602 to the battery charger 2600 by operating the operation key 2606 and can control communication of another electronic device by causing the electronic device to receive signals that can be sent by the battery charger 2600, it can also be referred to as a general-purpose remote control device. The present invention can provide a relatively large-sized (22-inch to 50-inch) portable TV through an inexpensive manufacturing process.

In a mobile phone shown in FIG. 11, a main body (A) 1901 including operation switches 1904, a microphone 1905, and the like is connected by a hinge 1910 to a main body (B) 1902 including a display panel (A) 1908, a display panel (B) 1909, a speaker 1906, and the like so as to be openable and closable. The display panel (A) 1908 and the display panel (B) 1909 are stored in a chassis 1903 of the main body (B) 1902 together with a circuit board 1907. Pixel portions of the display panel (A) 1908 and the display panel (B) 1909 are placed so as to be visible through open windows formed in the chassis 1903.

As for the display panel (A) 1908 and the display panel (B) 1909, the specification such as the number of pixels can be appropriately set in accordance with functions of the mobile phone 1900. For example, the display panel (A) 1908 and the display panel (B) 1909 can be combined as a main screen and a sub-screen, respectively.

The mobile phone according to this embodiment can be modified in various modes depending on functions or applications thereof. For example, it may be a camera-equipped mobile phone by incorporating an imaging element in the hinge 1910. Even when the operation switches 1904, the display panel (A) 1908, and the display panel (B) 1909 are stored in one chassis, the above-described effect can be obtained. Further, a similar effect can be obtained when the structure of this embodiment is applied to an information display terminal provided with a plurality of display portions.

As described above, the liquid crystal display device obtained by implementing the present invention may be used as display portions of various electronic devices. Note that the liquid crystal display device manufactured using any of the structures in Embodiment Modes 1 and 2 and Embodiments 1 and 2 may be used for the electronic device of this embodiment.

This embodiment can be freely combined with any one of Embodiment Modes 1 and 2 and Embodiments 1 and 2.

INDUSTRIAL APPLICABILITY

According to the present invention, a step of applying an alignment film, a step of baking an alignment film, and the like can be omitted, and processing time and manufacturing cost can be reduced.

This application is based on Japanese Patent Application serial no. 2005-338087 filed in Japan Patent Office on Nov. 24, 2005, the content of which are hereby incorporated by reference.

The invention claimed is:

1. A method for manufacturing a liquid crystal display device including a first substrate, a second substrate, and liquid crystal held between the first substrate and the second substrate, comprising the steps of:
   forming a pixel electrode over the first substrate;
   forming an opposite electrode over the second substrate;
   drawing and temporarily fixing a sealant over the second substrate;
   dropping a mixture containing a liquid crystal material and a silane coupling agent in a region surrounded by the sealant over the second substrate;
   attaching the first substrate and the second substrate to each other;
   performing a realignment treatment at 100° C. to 170° C. so that long axes of liquid crystal molecules become perpendicular to the first substrate; and
   fixing the sealant.

2. The method for manufacturing a liquid crystal display device according to claim 1, wherein the mixture contains the silane coupling agent of 0.001 wt % to 10 wt %.

3. The method for manufacturing a liquid crystal display device according to claim 1, wherein the mixture is formed by stirring the silane coupling agent into the liquid crystal material.

4. The method for manufacturing a liquid crystal display device according to claim 1, wherein the liquid crystal material contains a solvent, which promote hydrolysis of the silane coupling agent, of 0.0001 wt % to 1 wt %.

5. The method for manufacturing a liquid crystal display device according to claim 1, wherein the sealant includes a spherical spacer.

6. The method for manufacturing a liquid crystal display device according to claim 1, wherein the step of attaching the first substrate and the second substrate to each other is conducted under reduced pressure.

7. A method for manufacturing a liquid crystal display device including a first substrate, a second substrate, and liquid crystal held between the first substrate and the second substrate, comprising the steps of:
   forming a pixel electrode over the first substrate;
   forming a columnar spacer over the pixel electrode;
   forming an opposite electrode over the second substrate;
   drawing and temporarily fixing a sealant over the second substrate;
   dropping a mixture containing a liquid crystal material and a silane coupling agent in a region surrounded by the sealant over the second substrate;
   attaching the first substrate and the second substrate to each other;
   performing a realignment treatment at 100° C. to 170° C. so that long axes of liquid crystal molecules become perpendicular to the first substrate; and
   fixing the sealant.

8. The method for manufacturing a liquid crystal display device according to claim 7, wherein the mixture contains the silane coupling agent of 0.001 wt % to 10 wt %.

9. The method for manufacturing a liquid crystal display device according to claim 7, wherein the mixture is formed by stirring the silane coupling agent into the liquid crystal material.

10. The method for manufacturing a liquid crystal display device according to claim 7, wherein the liquid crystal material contains a solvent, which promote hydrolysis of the silane coupling agent, of 0.0001 wt % to 1 wt %.

11. The method for manufacturing a liquid crystal display device according to claim 7, wherein the step of attaching the first substrate and the second substrate to each other is conducted under reduced pressure.

12. A method for manufacturing a liquid crystal display device including a first substrate, a second substrate, and liquid crystal held between the first substrate and the second substrate, comprising the steps of:
   forming a pixel electrode and a first rib over the first substrate;
   forming an opposite electrode and a second rib over the second substrate;
   drawing and temporarily fixing a sealant over the second substrate;
   dropping a mixture containing a liquid crystal material and a silane coupling agent in a region surrounded by the sealant over the second substrate;
   attaching the first substrate and the second substrate to each other;
   performing a realignment treatment at 100° C. to 170° C. so that long axes of liquid crystal molecules become perpendicular to the first substrate; and
   fixing the sealant.

13. The method for manufacturing a liquid crystal display device according to claim 12, wherein the mixture contains the silane coupling agent of 0.001 wt % to 10 wt %.

14. The method for manufacturing a liquid crystal display device according to claim 12, wherein the mixture is formed by stirring the silane coupling agent into the liquid crystal material.

15. The method for manufacturing a liquid crystal display device according to claim 12, wherein the liquid crystal material contains a solvent, which promote hydrolysis of the silane coupling agent, of 0.0001 wt % to 1 wt %.

16. The method for manufacturing a liquid crystal display device according to claim 12, wherein the first and second ribs are an organic resin or an inorganic insulating material.

17. The method for manufacturing a liquid crystal display device according to claim 12, wherein the step of attaching the first substrate and the second substrate to each other is conducted under reduced pressure.

* * * * *